(12) United States Patent
Ghai et al.

(10) Patent No.: US 8,385,903 B2
(45) Date of Patent: Feb. 26, 2013

(54) TRANSFERRING SESSIONS IN A COMMUNICATIONS NETWORK

(75) Inventors: Rajat Ghai, Sandwich, MA (US); Sourabh Anpat, London (GB)

(73) Assignee: Cisco Technology, Inc., San Jose, CA (US)

( * ) Notice: Subject to any disclaimer, the term of this patent is extended or adjusted under 35 U.S.C. 154(b) by 436 days.

(21) Appl. No.: 12/686,159

(22) Filed: Jan. 12, 2010

(65) Prior Publication Data

US 2010/0279670 A1    Nov. 4, 2010

Related U.S. Application Data

(60) Provisional application No. 61/144,002, filed on Jan. 12, 2009, provisional application No. 61/262,439, filed on Nov. 18, 2009.

(51) Int. Cl.
*H04M 3/00* (2006.01)
(52) U.S. Cl. ..... 455/420; 455/419; 455/418; 455/414.3; 455/414.2
(58) Field of Classification Search .......... 455/418–420, 455/414.1–414.3, 503; 370/259–270; 709/217–219, 709/227–229, 243–246; 725/62, 86–99
See application file for complete search history.

(56) References Cited

U.S. PATENT DOCUMENTS

| | | | |
|---|---|---|---|
| 2002/0161895 A1* | 10/2002 | Appiah et al. | 709/227 |
| 2004/0158855 A1 | 8/2004 | Gu et al. | |
| 2006/0155839 A1 | 7/2006 | Hundscheidt et al. | |
| 2006/0256751 A1 | 11/2006 | Jagadeesan et al. | |
| 2007/0155386 A1 | 7/2007 | Wahl et al. | |
| 2010/0036958 A1* | 2/2010 | Mahdi | 709/227 |

OTHER PUBLICATIONS

3GPP TS 22.228 V9.0.0 (Dec. 2008): 3rd Generation Partnership Project; Technical Specification Group Services and System Aspects; Service requirements for the Internet Protocol (IP) multimedia core network subsystem; Stage 1 (Release 9).*
TS 22.228, and in further view of 3GPP TS 23.237 V8.1.0 (Sep. 2009): 3rd Generation Partnership Project; Technical Specification Group Services and Architecture; IP Multimedia Subsystem (IMS) Service Continuity; Stage 2 (Release 8).*
International Search Report and Written Opinion for International Application No. PCT/US10/20763 mailed Nov. 28, 2011. 7 pages.

* cited by examiner

*Primary Examiner* — Patrick Edouard
*Assistant Examiner* — Ronald Eisner
(74) *Attorney, Agent, or Firm* — Wilmer Cutler Pickering Hale and Dorr LLP

(57) ABSTRACT

Systems and methods for transferring a session or components of a session in a communication network are provided. The components of the session include media flows and control over the media flows. The user can initiate a transfer of a existing session with a mobile device such as user equipment (UE) to one or more devices that may lead to fan-out or fan-in to multiple devices. This can include separating the delivery of media from the control of the delivery. For example, a UE can be designated a controller to control another UE, such as a television (TV). In providing the capability to transfer these sessions, a gateway is used to implement network functions that allow the streaming to be controlled and delivered to the respective UEs. In some embodiments, the gateway can be flexible and its operation modified according to messages it receives.

19 Claims, 13 Drawing Sheets

TRANSFERRING SESSIONS IN A COMMUNICATIONS NETWORK

CROSS-REFERENCE TO RELATED APPLICATIONS

This application claims benefit under 35 U.S.C. §119(e) of U.S. Provisional Patent Application No.: 61/144,002, entitled "Transferring Sessions in a Communications Network," filed Jan. 12, 2009, and of U.S. Provisional Patent Application No.: 61/262,439, entitled "Transferring Sessions in a Communications Network," filed Nov. 18, 2009, which are hereby incorporated by reference herein in their entireties.

FIELD OF THE DISCLOSURE

This disclosure relates to a system and method for transferring a session or components of a session in a communication network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

The first generation of wireless telephone technology used analog mobile phones in which analog information signals were modulated and transmitted. In second generation (2G) systems, digital information signals were used to modulate a carrier. These 2G technologies used time division multiplex access (TDMA) technology for GSM systems, or code division multiple access (CDMA) technologies for IS-95 systems to distinguish multiple users. Such networks were further upgraded to handle higher-speed packet data using GPRS/EDGE and then HSPA, and CDMA 1x-EVDO in networks referred to as 2.5G and 3G networks. The next evolution is 4G technology, which is referred to as long term evolution-system architecture evolution (LTE-SAE) and uses orthogonal frequency division multiple access (OFDMA) technology. Other wireless protocols have also developed including WiFi (an implementation of various IEEE 802.11 protocols), WiMAX (an implementation of IEEE 802.16), and HiperMAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. A macro cell transceiver is typically used by service providers to provide coverage over about a five kilometer distance. A pico cell transceiver can provide coverage over about a half kilometer distance, and a femto cell transceiver can provide coverage over a 50-200 meter distance. A femto cell transceiver is similar in coverage to a WiFi (WLAN) access point and can be used to provide network access over a short range.

A part of the evolution of packet based communications has been the development of IP Multimedia Subsystem (IMS). IMS is an architectural framework for delivering internet protocol (IP) multimedia to mobile nodes. A call session control function (CSCF) can manage much of the signaling that occurs in an IMS core. The CSCF functionality can be logically divided into three functionalities: a Proxy-CSCF (P-CSCF), an Interrogating CSCF (I-CSCF), and a Serving CSCF (S-CSCF). Additionally, the CSCF functionality is envisioned by two different groups for inclusion in two different topologies: Global System for Mobile Communications (GSM) and CDMA 2000. The 3rd Generation Partnership Project (3GPP) is responsible for IMS, which works with GSM/LTE systems and the $3^{rd}$ Generation Partnership Project 2 (3GPP2) is responsible for Multimedia Domain (MMD), which is used with CDMA systems and is similar to the 3GPP IMS concept.

SUMMARY OF THE DISCLOSURE

Systems and methods for transferring a session or components of a session in a communication network are provided. The transfer can include some or all of the media flows that are flowing to a device and control over the media flows in a communication network is disclosed. The user can initiate a transfer with a mobile device such as user equipment (UE) that has control over the delivery of the media flow and other aspects of the media flow. For example, one or more media flows can be transferred or multicast to one or more other user equipment. This can include separating the delivery of media from the control of the delivery. For example, a UE can be designated a controller to control another UE, such as a television (TV). In providing the capability to transfer these sessions, a gateway is used to implement network functions that allow the streaming to be controlled and delivered to the respective UEs. In some embodiments, the gateway can be flexible and its operation modified according to messages it receives. The gateway can also be used to implement a number of functions such as a call session control function (CSCF) and a service consistency and continuity application server (SCC AS).

A gateway providing a service consistency and continuity (SCC) application server (AS) functionality for use in communicating in a session with at least one user equipment (UE) in a communication network is presented in some embodiments. The gateway includes an interface for communicating with the at least one user equipment (UE) in the session, wherein the session includes a media stream and a service control signaling path used to perform service control of the session, a continuous service experience (CSE) function provided by the SCC AS functionality configured to support separate and independent transfer of the media stream and service control across a plurality of user equipment anchored at the SCC AS, wherein the SCC AS function authorizes the transfer of the media stream based upon a media transfer request received from the at least one UE with service control, wherein the media transfer request identifies the media stream to transfer and at least one target UE to which to transfer the media stream, and initiates the transfer of the media stream to the at least one target UE, and authorizes the transfer of the service control based upon a service control transfer request received from the at least one UE with service control, wherein the service control transfer request identifies the session and a target UE to which to transfer the service control.

In certain embodiments, a method of transferring a session among a plurality of user equipment (UE) in communication with a service consistency and continuity (SCC) application server (AS) functionality that resides on a gateway is presented. The method including receiving, at the SCC AS, a media transfer request from a first UE to transfer at least one media stream in the session to at least one target UE, wherein the first UE includes service control over the session, authorizing, at the SCC AS, the transfer of the at least one media stream from the first UE to the at least one target UE independently and separately of a transfer of service control of the session, sending, from the SCC AS, to the at least one target UE a media transfer request to transfer the at least one media stream, sending, from the SCC AS, to the first UE an acknowledgement when the transfer of the at least one media stream is complete so that the at least one media stream to the first UE is deactivated, receiving, at the SCC AS, from the first UE signaling regarding service control of the at least one media stream to the at least one target UE, and managing, at the SCC AS, the at least one media stream to the at least one target UE based on the first UE control signaling.

In yet other embodiments, a user equipment configured to communicate with a communication network and receive a media stream in a session is presented, the user equipment including a user interface for communicating instructions to the user equipment and a display device for displaying the media stream and other information, and the user equipment configured to send a transfer media request to transfer at least one media stream separately and independently of control of the media stream, and send a service control transfer request to transfer service control of the at least one media stream to a second user equipment.

DETAILED DESCRIPTION

Figure 1:
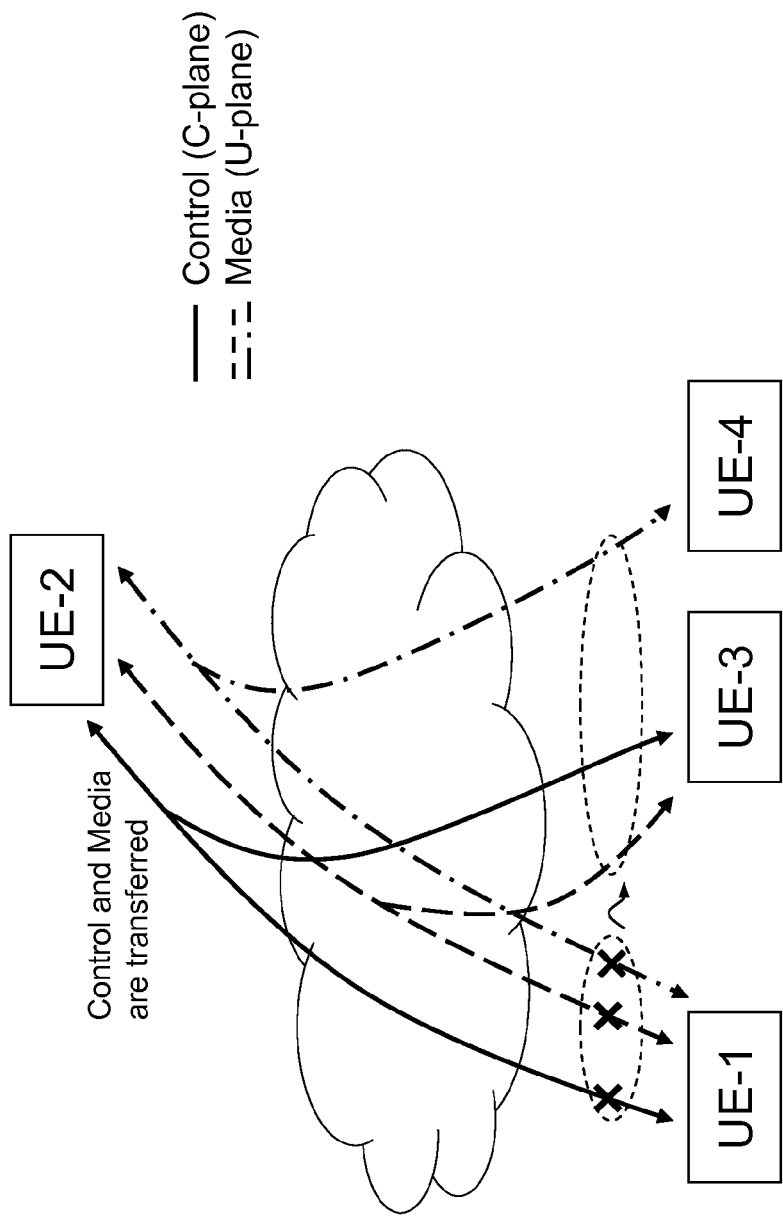
FIG. 1 illustrates a transfer of media flows and control capabilities in a communication network in accordance with some embodiments.

Systems and methods for transferring a session or components of a session in a communication network are disclosed. The session can be an IP Multimedia Subsystem (IMS) session that includes one or more media streams and at least one user equipment (UE). The user equipment can be any device attached to the network, for example, a personal computer, a mobile phone, a television, a surveillance camera, or a SIP enabled landline phone. The session can be controlled by a designated UE, and this UE's ability to control the session can be transferred to another UE. The UE controlling the session can control aspects of the media streams by communicating with a server providing the media stream content. Aspects that can be controlled, for example, are the type of content provided or the quality of the content provided.

The UE with control capabilities can initiate a number of different types of transfers. In some embodiments, the user can start a session on a first UE and subsequently transfer the session to one or more UEs while maintaining session continuity among the devices. By maintaining session continuity the session remains intact and is not terminated even though the session is moved among UEs. An example of this is transferring a voice call from a mobile phone to a desktop phone, or transferring some components of an audio/video session where the audio portion is kept on the phone while the video components are moved to a projector or set-top TV. In certain embodiments, a media stream can be transferred independently of control of the media stream. For example, a media stream can be transferred from UE #1 to UE #2 and the control of the media stream can either be maintained on UE #1, transferred to UE #2, or transferred to UE #3. A user can thus enter his/her home and transfer a video from a mobile device to a TV while continuing to the use the mobile device as a remote control for the TV. The user could later decide to transfer control from the mobile phone to a laptop in the room and use the laptop to control the content on the TV, or give control to the TV to control the content.

Inter UE transfer (IUT) allows the transfer of a multimedia session or service control from a first UE to other UEs. For example, a user is on his way to work and receives a phone call on his mobile phone. When he gets to the office, he wishes to continue the call on his desk phone. There are a number of ways this can be achieved: (1) request a pull of the voice media from the desk phone, or (2) discover that the desk phone is available to transfer the call to and initiate a transfer of the voice media from the mobile phone.

A Continuous Service Experience (CSE) is a mechanism that supports the capability to transfer some or all of the media flows and/or service control across the CSE user equipment set. The CSE UE set is a set of one or more CSE-capable UEs under the control of the same end user. A logical set of one or more multimedia sessions (on a CSE UE set) anchored at a service consistency and continuity (SCC) application server (AS) that are combined as one multimedia session towards a remote leg can be considered a service instance. The service instance can be uniquely identified by one or more IDs (e.g., an STI). CSE service control signaling is a signaling path used to perform service control of a service instance. Media control signaling is a signaling path used to manage media flows on a UE's access leg. A CSE controller UE is a UE that performs service control of a service instance. A CSE controllee UE is one or more UEs that have media flows without an associated CSE Service Control signaling. CSE-SCmode-keep is a UE mode where the UE assumes the role of a CSE controller UE, even if it results in having no media component left on this UE. CSE-SC-mode-release is a UE mode where the UE abandons the role of a CSE controller UE, i.e., it relinquishes service control and may assume the role of a CSE controllee UE if it has media.

Service continuity for inter UE transfer scenarios allow transfer of control to execute session transfers between different UEs subscribed to the same user. FIG. 1 illustrates the transfer of media flows and service control in accordance with certain embodiments. As shown in FIG. 1, UE-1 transfers the media flows to UE-3 and UE-4 while transferring the control of future transfers to UE-3. In this example, UE-1 is using an IP-CAN/PS domain and has a multimedia session with a Remote UE, which is anchored at the SCC AS. The multimedia session contains two media components and UE-1 wants to transfer one or more of them to other UEs (i.e., UE-3 and UE-4 that are also using an IP-CAN/PS domain). It is assumed that UE-1, UE-3, and UE-4 belong to the same subscriber (i.e., they share the same subscription).

Figure 2:
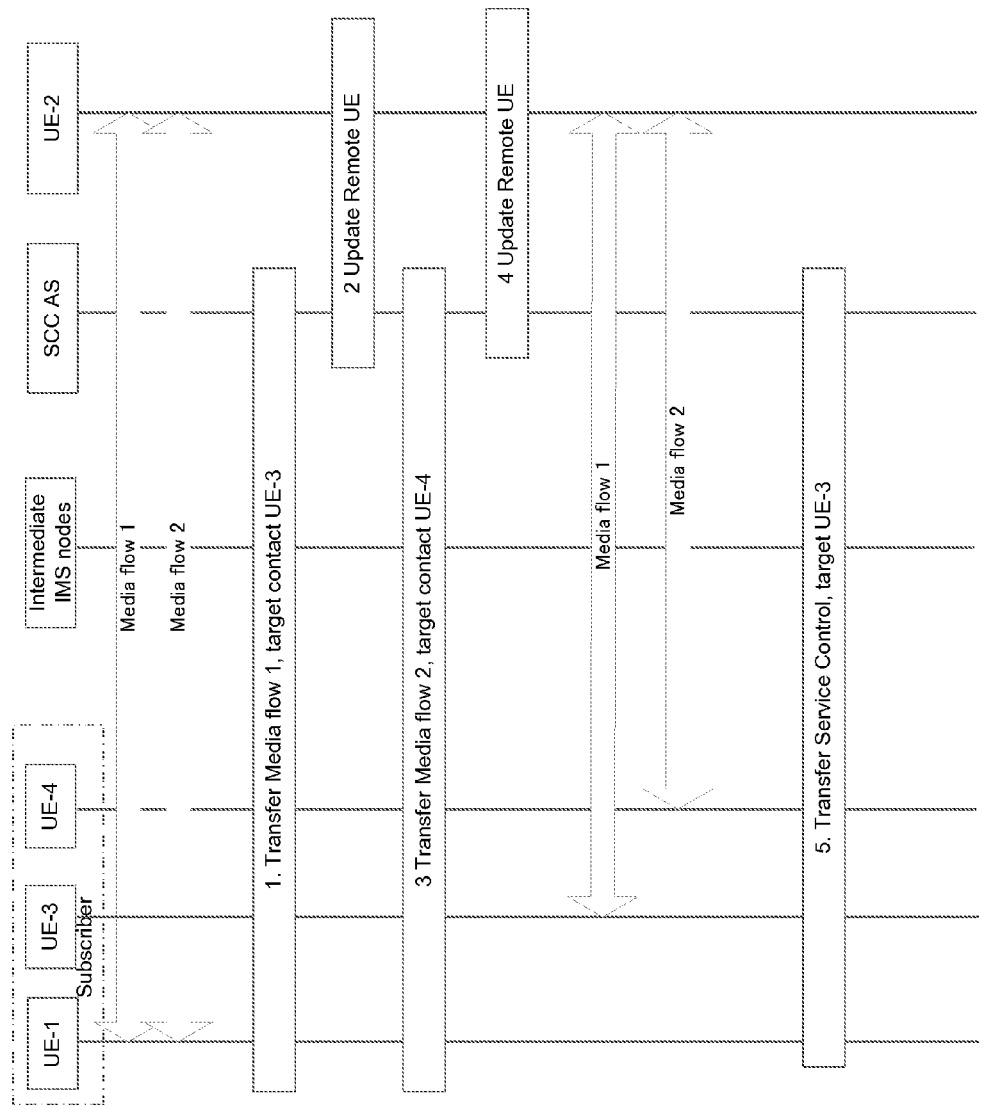
FIG. 2 illustrates a call flow for transfer of media flows and control capabilities in a communication network in accordance with some embodiments.

FIG. 2 illustrates a call flow for media flow transfer and transfer of service control in accordance with some embodiments. In reference 1, UE-1 initiates media flow transfer for media flow 1 between UE-1 and UE-2, to UE-3 and UE-2. In reference 2, SCC AS updates remote UE (UE-2) to update the media flow path to point to UE-3. In reference 3, UE-1 initiates media flow transfer of media flow 2 between UE-1 and UE-2, to UE-2 and UE-4. In reference 4, SCC AS updates remote UE (UE-2) to update the media flow path to point to UE-4. In reference 5, UE-1 initiates transfer of service control to UE-3.

Figure 3:
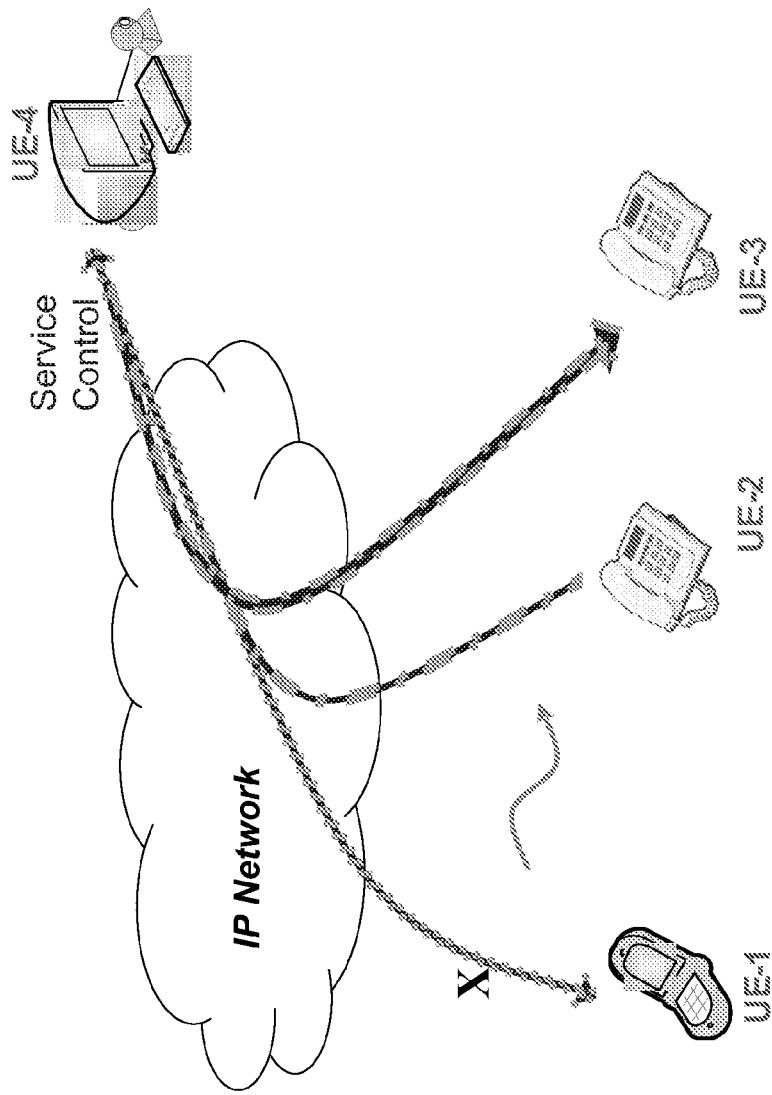
FIG. 3 illustrates a transfer of service control among devices in a communication network in accordance with some embodiments.
Figure 4:
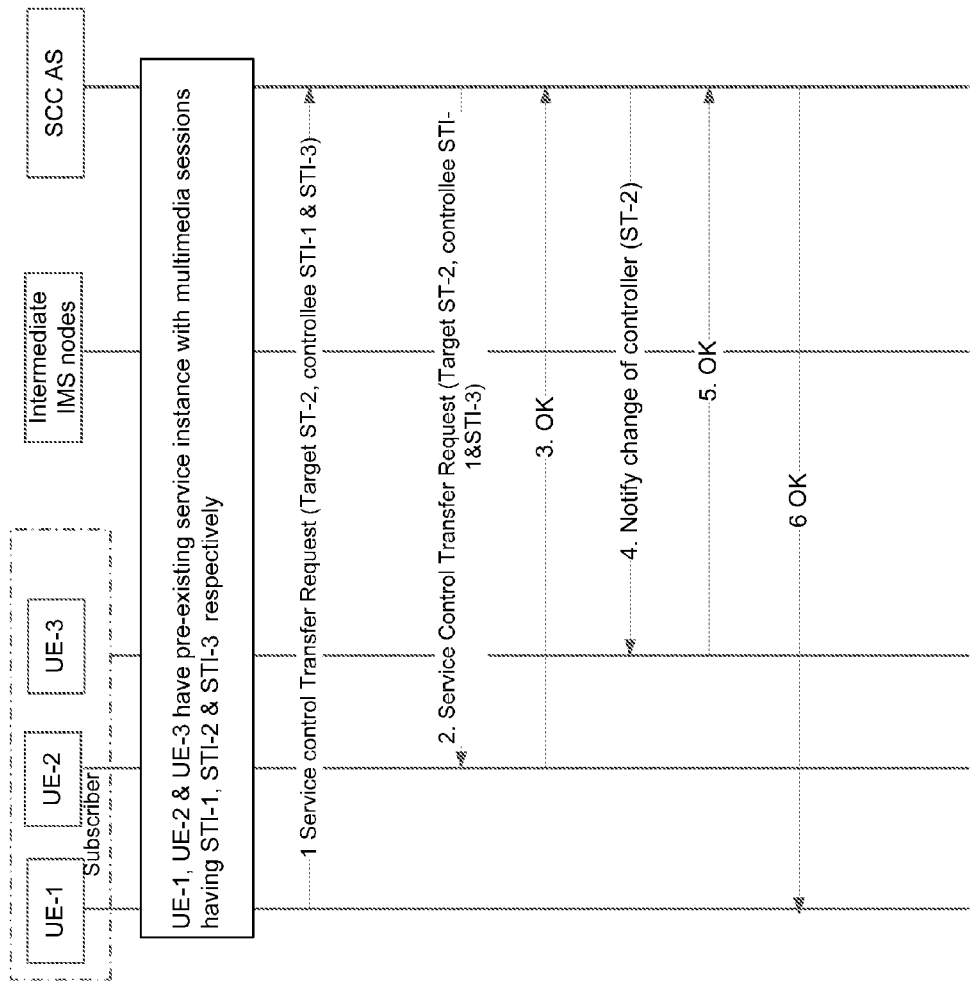
FIG. 4 illustrates a call flow for transfer of service control among devices in a communication network in accordance with some embodiments.

FIG. 3 shows an example of service continuity for inter UE transfer (IUT) scenarios that provide transfer of control to execute session transfers between different UEs owned by the same subscriber. Here UE 1 transfers the service control to UE 2, and UE-4 is notified about the change in service control. FIG. 4 illustrates flow for transfer of service control in accordance with some embodiments. The FIG. 4 call flow shows how inter UE transfer of service control can be implemented. A service instance can be used to identify a session. Taking UE-1, UE-2 and UE-3 of FIG. 4, there are service instances each including a multimedia session with UE-1 having STI-1, UE-2 having STI-2 and UE-3 having STI-3, where STI is the service instance ID.

Service control transfer is initiated from UE-1 to UE-2 as shown in the FIG. 4. In reference 1 in FIG. 4, UE-1 decides to transfer service control from UE-1 to UE-2. UE-1 sends a Service Control Transfer Request (Target, ST-2). The Target identifies the UE that serves as the target of service control transfer. The Session Info identifies an anchored session at the SCC AS that is associated with this request. The service control Transfer Request is routed to SCC AS (directly or through iFC), which should authorize the service control transfer operation. The initial filter criteria (iFC) is a logical set of rules with trigger points that assist with routing session initiation protocol (SIP) messages in the gateway, which can implement serving call session control functionality (S-CSCF). The iFC can also include a collection of user related information such as a user profile. Authorization in this step by SCC AS is implemented in order to make sure, e.g., that both UEs share the same subscription. In reference 2, SCC AS correlates ST-2 to UE-2 and sends a service control transfer request to UE-2. In reference 3, UE-2 accepts and sends an acknowledgement (OK) back to the SCC AS. In reference 4, SCC AS Notifies UE-3 about transfer of service control from UE-1 to UE-2. In reference 5, UE-3 acknowledges the Notification. In reference 6, SCC AS acknowledges to UE-1 that transfer of "Service Control Transfer" is complete.

Figure 5:
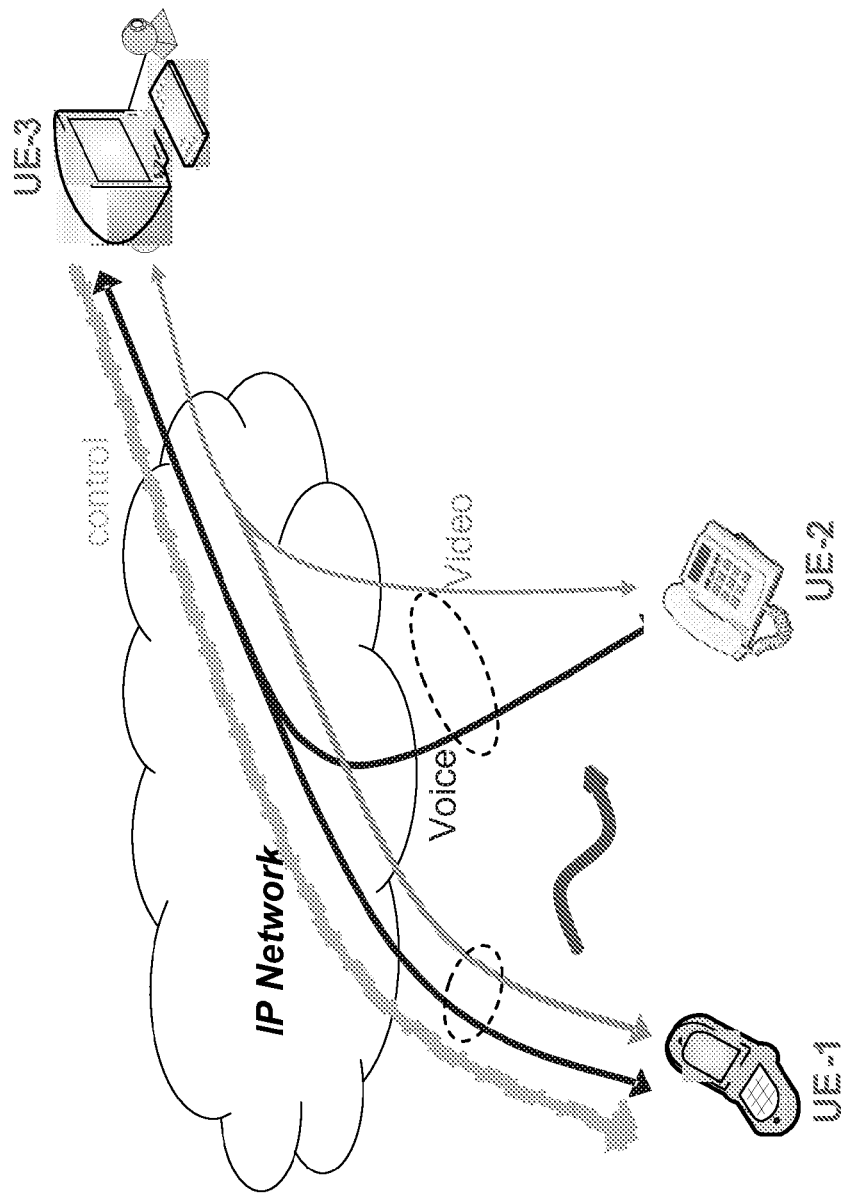
FIG. 5 illustrates transferring media flows while retaining service control in accordance with some embodiments.

FIG. 5 is an example of how continuous service experience for inter UE transfer scenarios provides transfer of control to execute session transfers between different UEs owned by the same subscriber. Here, UE1 transfers only the media flows to UE 2. Service Control is kept in UE1 (CSE controller UE).

Figure 6:
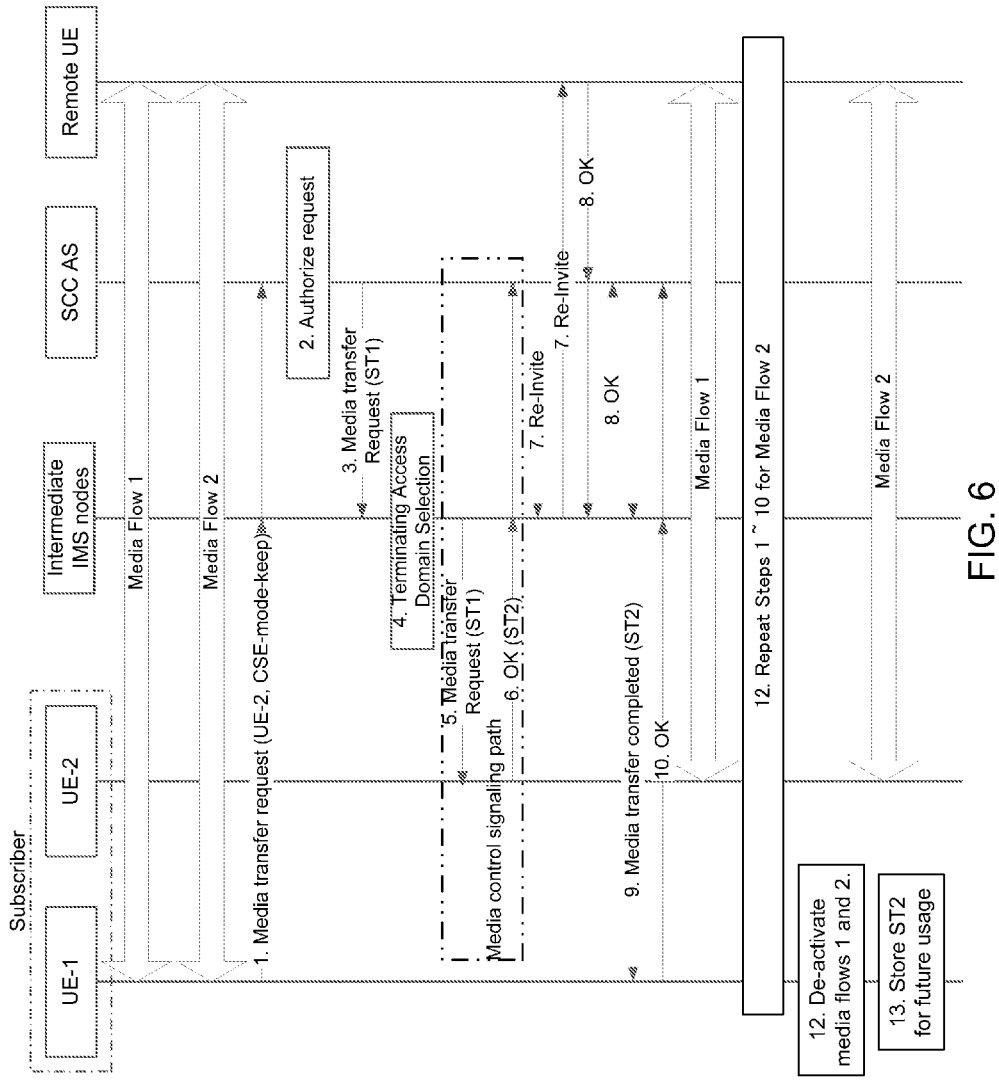
FIG. 6 illustrates a call flow for transferring media flows while retaining service control in accordance with some embodiments.

FIG. 6 illustrates how Inter UE Transfer of media flows can be implemented in accordance with some embodiments. UE-1 has a multimedia session with a remote UE. The multimedia session contains several media components, and UE-1 wants to transfer the media flows to UE-2. It is assumed that UE-1 and UE-2 are controlled by the same end user. In reference numbers 1-2 in FIG. 6, UE-1 decides to transfer one or more media components to UE-2 and sends a Media Transfer Request (Target, Media, Session Info). UE-1 also indicates control mode as "CSE-mode-keep". The target identifies the UE that serves as the target of media transfer and media identifies the active media components that should be transferred. The Session Info identifies an anchored session at the SCC AS that is associated with this request. The media transfer request is routed to SCC AS (directly or through iFC), which should authorize the media transfer operation. Authorization in this step by SCC AS is used to make sure, e.g., that both UEs controlled by the same end user.

In reference numbers 3-5, the media transfer request is sent to UE-2, which identifies the media flow that need to be established on UE-2. The media transfer request, includes a ST1. In this example, it is assumed that UE-2 is using an IP-CAN so the PS domain is selected for terminating the media transfer request. In case UE-2 is using the CS domain, the media transfer request in step 5 is routed to a border gateway control function (BGCF)/media gateway control function (MGCF) and it is inter-worked with the CS domain. In reference 6, UE-2 accepts the media transfer request. In reference numbers 7-8, the SCC AS sends a re-invite request to the remote UE in order to redirect the requested media from UE-1 to UE-2. The remote UE is identified from the Access Leg information received in step 1. After this step, the remote UE starts sending the media for stream 1 to UE-2. In reference numbers 9-10, the SCC AS acknowledges to UE-1 that the media flow transfer operation was successfully completed and the corresponding media can be deactivated. The acknowledgement also contains ST2 that maps to the CSE media control signaling path for the session on UE-2. In reference 11, steps 1 through 10 are repeated for Media flow 2. In reference 12, UE-1 deactivates the media flows 1 and 2 locally. In reference 13, UE-1 stores ST-2 for future CSE service control.

Figure 7:
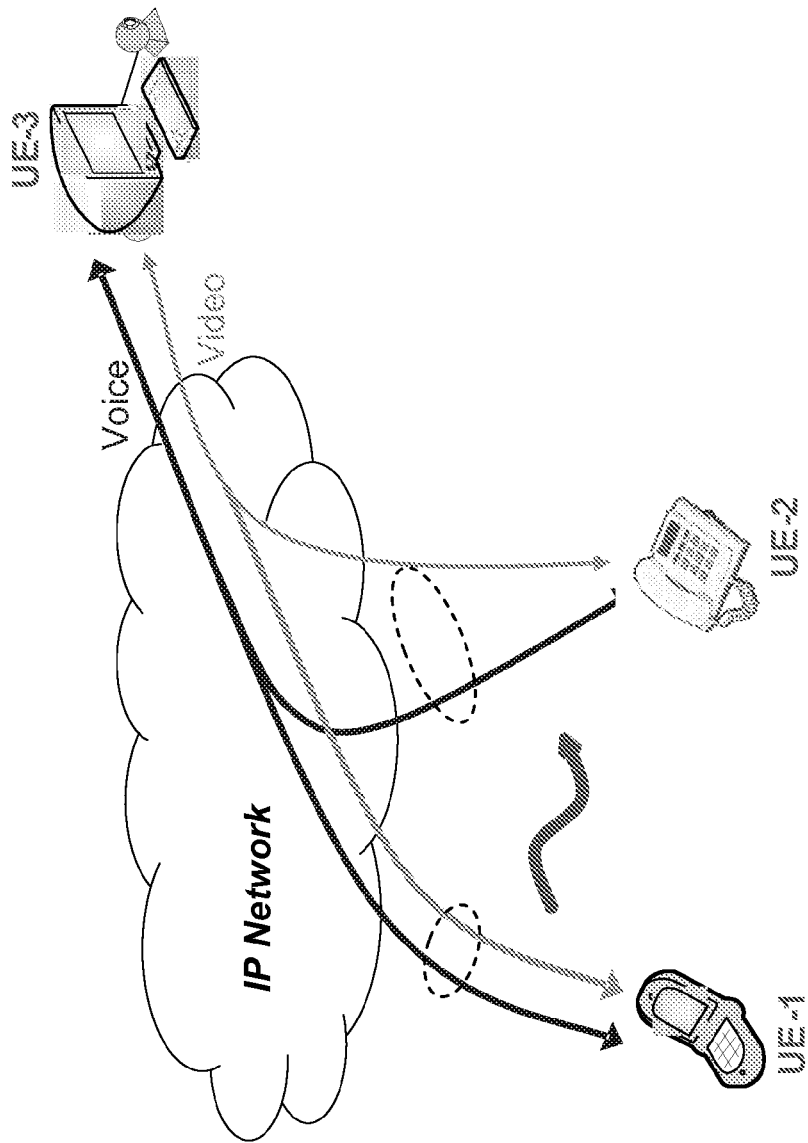
FIG. 7 illustrates a session transfer between user equipment in accordance with some embodiments.

FIG. 7 provides an example for how continuous service experience for inter UE transfer scenarios provides for transfer of control to execute session transfers between different UEs owned by the same subscriber. Here, UE1 transfers the media flows and service control to UE 2.

Figure 8:
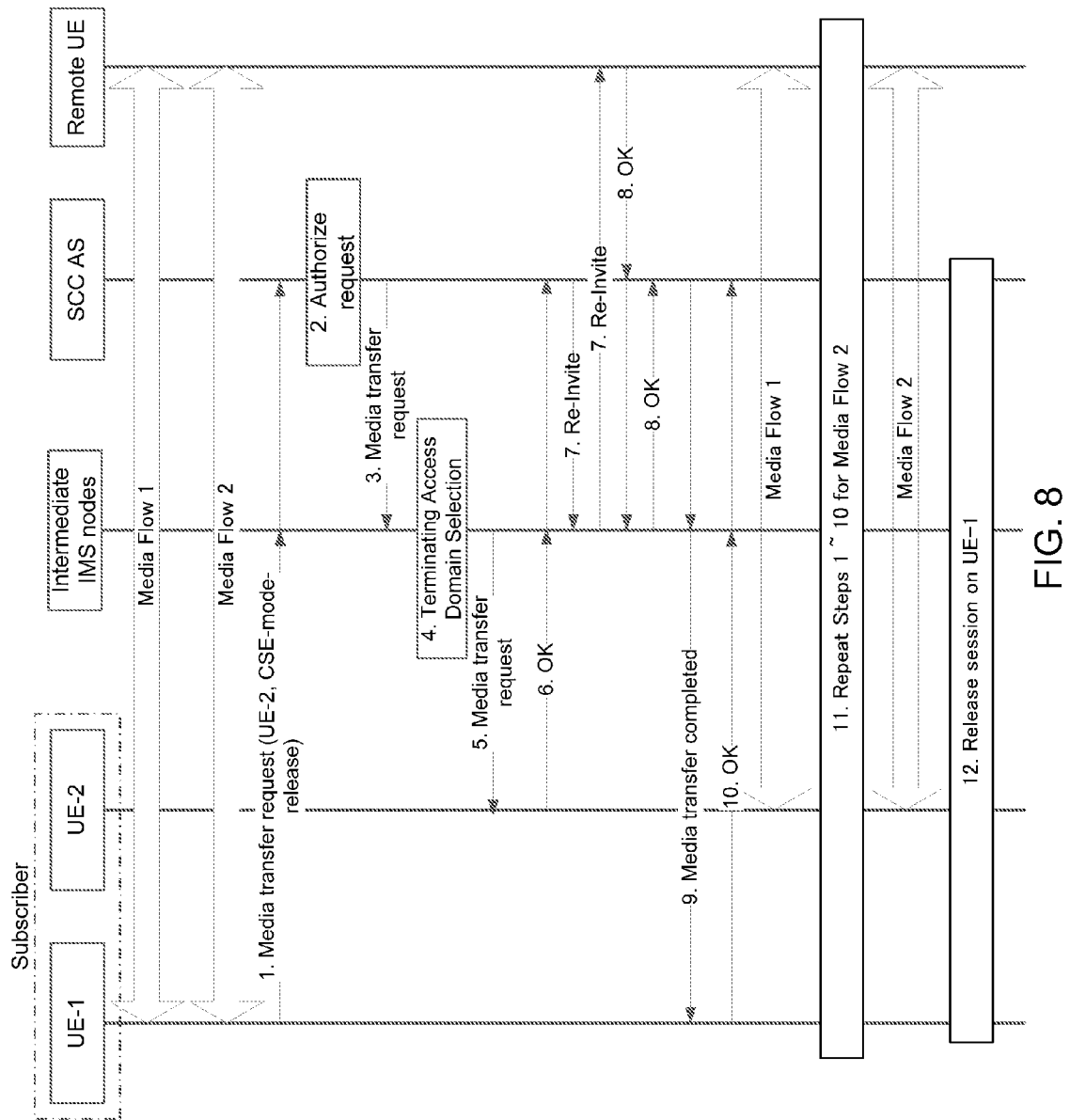
FIG. 8 illustrates a call flow for transfer of a session between user equipment in accordance with some embodiments.

FIG. 8 illustrates how inter UE transfer of media flows and service control can be implemented in accordance with some embodiments. UE-1 has a multimedia session with a remote UE. The multimedia session contains several media components and UE-1 wants to transfer the media flows and service control to UE-2. The media flow(s) and service control are transferred from UE-1 to UE-2. It is assumed that UE-1 and UE-2 belong to the same subscriber (i.e., they share the same subscription).

In reference numbers 1-2 in the FIG. 8, UE-1 decides to transfer one or more media components to UE-2, so it sends a Media Transfer Request (Target, Media, Session Info).

UE-1 also indicates control mode as "CSE-mode-release." The target identifies the UE that serves as the target of media transfer and identifies the active media components that should be transferred. The Session Info identifies an anchored session at the SCC AS that is associated with this request. The media transfer request is routed to SCC AS (directly or through iFC), which should authorize the media transfer operation. Authorization in this step by SCC AS is used in order to make sure, e.g., that both UEs share the same subscription. In reference numbers 3-5, the media transfer request is sent to UE-2, which identifies the media flow that need to be established on UE-2. In this example, it is assumed that UE-2 is using an IP-CAN so the PS domain is selected for terminating the Media Transfer Request. In case UE-2 is using the CS domain, the media transfer request in step 5 is routed to a BGCF/MGCF and it is inter-worked with the CS domain.

In reference 6, UE-2 accepts the media transfer request. In reference numbers 7-8, the SCC AS sends a re-invite request to the remote UE in order to redirect the requested media from UE-1 to UE-2. The remote UE is identified from the Access Leg information received in step 1. After this step, the remote UE starts sending the media for stream 1 to UE-2. In reference numbers 9-10, the SCC AS notifies UE-1 that the media flow transfer operation was successfully completed and the corresponding media can be deactivated. In reference 11, steps 1 through 10 are repeated for media flow 2. In reference 12, multimedia session is released on UE-1.

Transfers of media flows and service control can be initiated under a variety of scenarios. For example, many transfers are initiated through user input such as the user indicating to the UE to change service control or the media flow. This can be accomplished through a user interface on the user equipment. The user can also setup a profile on the user equipment or through a portal, such as website, to define preferences of the user so that transfers can be initiated with little to no user intervention. For example, the user can setup the profile so that video is automatically transferred to the television when the user arrives home or is within a certain distance of the television. Location information through global position systems or other location based information in the network can be used in these types of transfers.

The user can also be prompted by the user equipment as to whether the user desires to initiate a transfer based on a set of conditions that have arisen. For example, the user has arrived at their home or office. The controller UE may also be able to sense other UEs, for example, through peer-to-peer communications or by detecting the other UE's presence. In such situations, the user can be prompted as to whether they would like to initiate a transfer. In some embodiments, a transfer can be initiated or the user prompted if the UE is about to lose power or signal with the network and there is an alternative UE option. For example, if a UE is about to run out of battery power the UE could transfer service control and the media flow to a UE such as a television.
Third Party Call Control Third party call control refers to the ability of one entity to create a call in which communication is actually between other parties. Typically, third party call control (3PCC) allows one entity (which we call the controller) to set up and manage a communications relationship or telephone call between two or more other parties. Third party call control is often used for operator services (where an operator creates a call that connects two participants together) and conferencing. Similarly, many SIP services are possible through third party call control. These include the traditional services on the PSTN, but also new ones such as click-to-dial, which allows a user to click on a web page to speak to a customer service representative.

Given the nature of third party call control (3PCC), multiple devices can perform 3PCC. There are at least two modes of 3PCC permitted within a communication network. The two modes of 3PCC differ in the amount of control that is afforded a mobile device such as User Equipment (UE). One alternative places an application server in control of the collaborative session transfer, while another alternative places the controller UE in control of the collaborative session transfer. The differences between these two alternatives can come down to where the third party call control resides. The 3PCC can reside in the network, and specifically in a service consistency and continuity (SCC) application server (AS). This implementation can build on IMS service continuity principles with session transfer procedures controlled by the SCC AS upon UE request. When the 3PCC is located in the SCC AS, the SCC AS is the first server for SCC capable UE originating sessions and the last AS for the terminating scenarios. The network based 3PCC can be based on a 3GPP standards TS 23.237, TS 24.237, in some embodiments.

In a second alternative, 3PCC resides in a controller UE or a designated mobile device. In this embodiment, the end user handling the controller UE is always in control of the collaborative session. This embodiment can be based on an IETF draft standard described in "draft-shacham-sipping-session-mobility-05.txt". Since a third party call control can be implemented in different devices, it is desirable to be able to support mobility of 3PCC while allowing inter UE transfers. In some embodiments, a gateway that provides an SCC AS functionality allows for different 3PCC modes within the network based on user or operator preferences.

Figure 9:
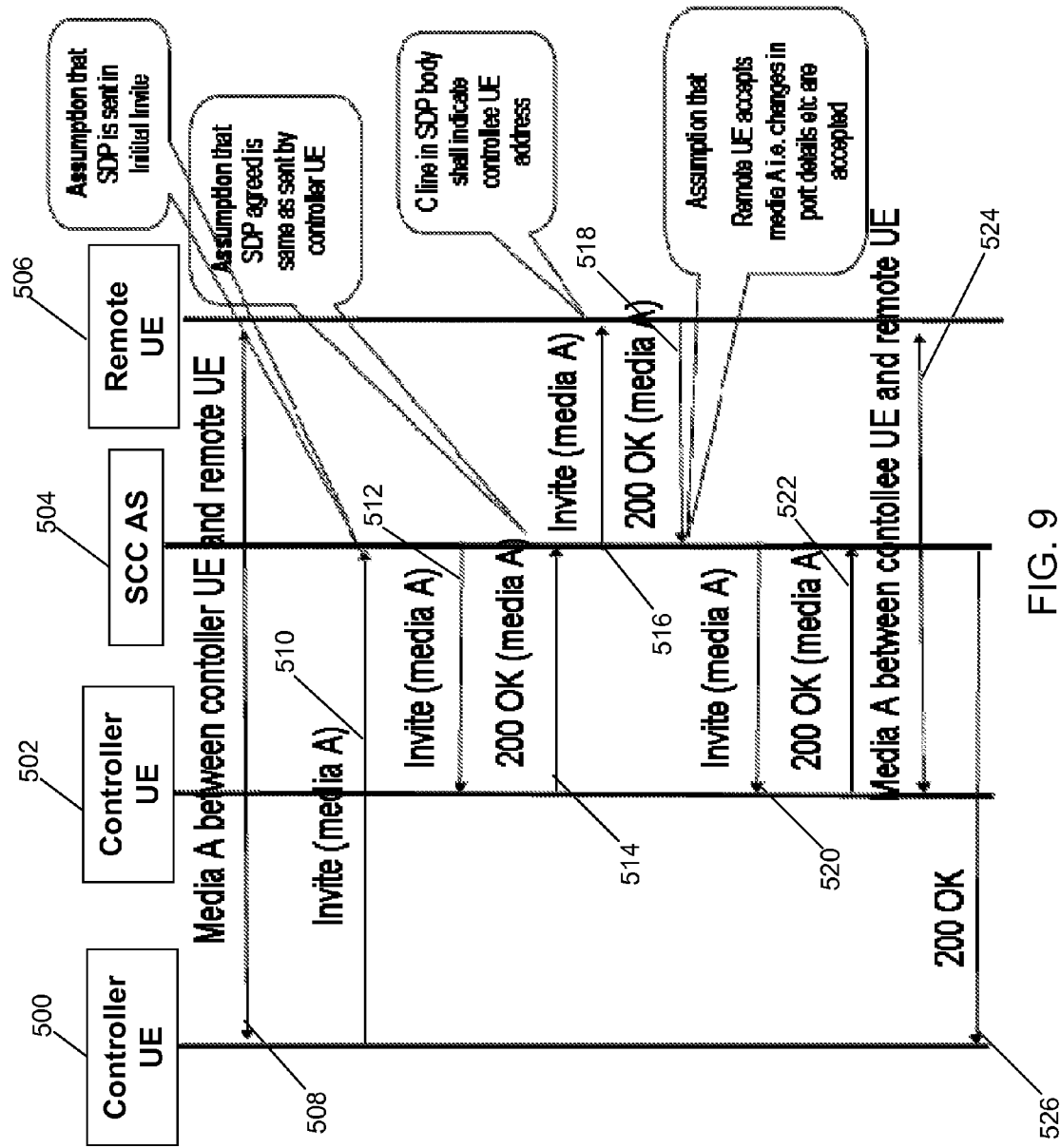
FIG. 9 illustrates a call flow for transfer of a media flow in a network-based implementation in accordance with some embodiments.

FIG. 9 illustrates a call flow for a media flow transfer in a network-based embodiment in accordance with some embodiments. FIG. 9 includes a controller UE 500, a controllee UE 502, a service consistency and continuity application server (SCC AS) 504, and a remote UE 506. In FIG. 9, the 3PCC can reside within the SCC AS 504. In this network 3PCC embodiment, the SCC AS 504 can act as a routing back-to-back user agent (B2BUA) and can negotiate the media to be transferred to the controllee UE. The implementation of a network-based 3PCC can proceed as follows for a media transfer. In 508, media A is being communicated between controller UE and remote UE. In 510, an invite message is sent from controller UE 500 to SCC AS 504 to initiate a transfer of media A. Since the controller UE is in control of the media stream, the invite can be sent from it even if the media stream is not currently coming to the controller UE. The invite message can be a session initiation protocol (SIP) message/session description protocol (SDP) message sent that includes the controllee UE information 502. The controllee UE 502 can be any device, such as a television, a computer, a smart phone, or a netbook.

The SCC AS 504 is responsible for sending an invite message 512 to controllee UE 502 for media A. In 514, controllee UE 502 acknowledges to SCC AS 504 that it can accept a media stream (i.e., media A). In 516, SCC AS 504 sends an invite message to the remote UE 506 which can include the controllee UE address and other information relevant to the media transfer. In 518, remote UE 506 sends an acceptance message (200 OK) that indicates that the remote UE 506 will transfer the media and provides information regarding the transfer to SCC AS 504. The SCC AS 504 sends an invite message 520 to controllee 502 to finalize the setup of the media stream between controllee UE 502 and remote UE 506. Controllee UE 502 sends a 200 OK message 522 to SCC AS 504 to accept any final negotiations/information regarding the media stream. In 524, a media stream is flowing between controllee UE 502 and remote UE 506. At the end of this process, the controller UE is notified of the successful transfer of the media to the controllee UE. In this network-based embodiment, the controller UE is generally unaware of the status of the IUT transfer.

Figure 10:
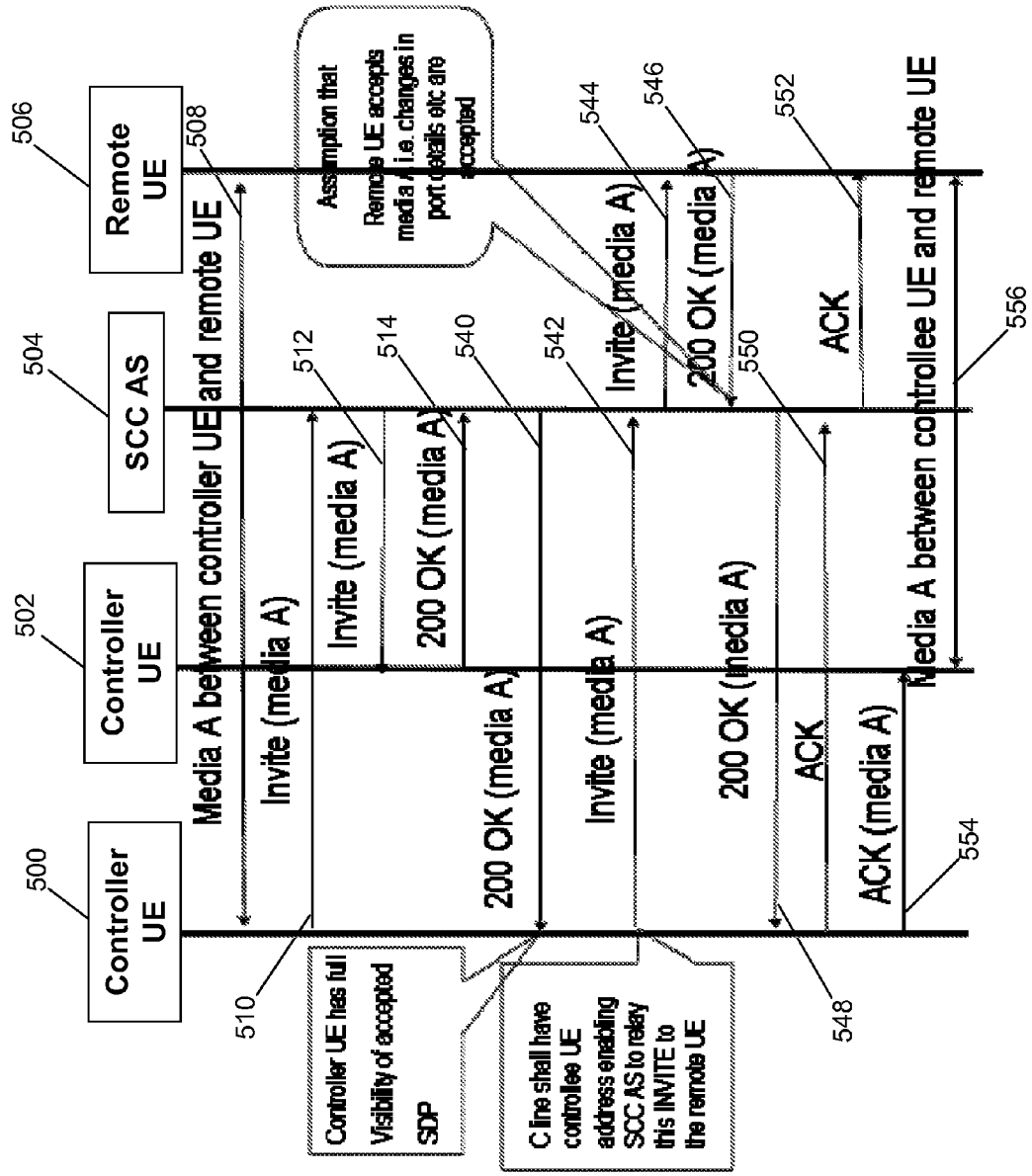
FIG. 10 illustrates a call flow for transfer of a media flow in a controller-based implementation in accordance with some embodiments.

FIG. 10 illustrates a call flow for a media flow transfer in a controller-based embodiment. When the 3PCC is located in the controller UE, the controller UE is more involved in a transfer or setup process. This allows more control for the human user behind the device who may choose to reject or cancel the IUT transfer at any stage. In this case, the SCC AS acts like a SIP proxy relaying messages between the different devices. FIG. 10 includes a controller UE 500, a controllee UE 502, a service consistency and continuity application server (SCC AS) 504, and a remote UE 506. As shown in FIG. 10, the initial messaging is the same as in FIG. 9. However, in 540, SCC AS 504 sends controller UE 500 the acceptance message (200 OK), which the 3PCC can receive regarding media A. The 3PCC can process the acceptance message at the controller UE 500, and in some embodiments, the user has both full visibility of the transfer as well as control to cancel the transfer.

The 3PCC can obtain information regarding the transfer (such as the controllee UE address information) and send this along in invite message 542 to SCC AS 504. Invite message 542 prompts SCC AS 504 to send an invite message 544 to remote UE 506, which can include information regarding the controllee UE 502 such as address information and port details. The remote UE 506 upon accepting the changes to media stream A sends an acceptance message (200 OK) 546 to SCC AS 504. The SCC AS 504 informs controller UE 500 with an acceptance message 548. Controller UE 500 sends and acknowledgement message 550 to SCC AS 504, which sends an acknowledgement message 552 to remote UE 506. Controller UE 500 also sends an acknowledgement message 554 to controllee UE 502 regarding the media stream A. In 556, media stream A begins between controllee UE 502 and remote UE 506.

As shown in FIGS. 9 and 10, the placement of the 3PCC impacts the messaging in the communication network and where decisions are made regarding the setup and transfer of media streams. Since the 3PCC can be implemented in different network devices depending on the embodiment, a mechanism is provided to switch the mode of operation and provide flexibility for the network to handle various placements of the 3PCC functionality. The mechanism to accommodate varying placement of call control can include messaging along with modifications to a gateway that can implement a SCC AS. The modifications can include programming or setting up the SCC AS functionality to switch between providing the 3PCC and messaging with a remote device that maintains 3PCC. The modifications can be to software code to enable the gateway to store relevant information relating to 3PCC for various UEs, and to communicate accordingly with other network devices such as the controller UE, controllee UE, and remote UE no matter what device has 3PCC.

In some embodiments, the gateway is configured to communicate with the network differently depending on the mode of operation. The mode of operation can be set depending on where the 3PCC is located in the network. For example, the gateway implementing the SCC AS can switch between a network-based 3PCC mode and a controller UE-based 3PCC mode. The gateway can also be configured to switch between other modes of operation. For example, discovery procedures, billing procedures, security procedures, or any other applicable mode of operation. In some embodiments, the mode of operation can be indicated to the gateway through an options message. The options message can be a SIP options message to negotiate where the 3PCC is located for a specified data flow.

Figure 11:
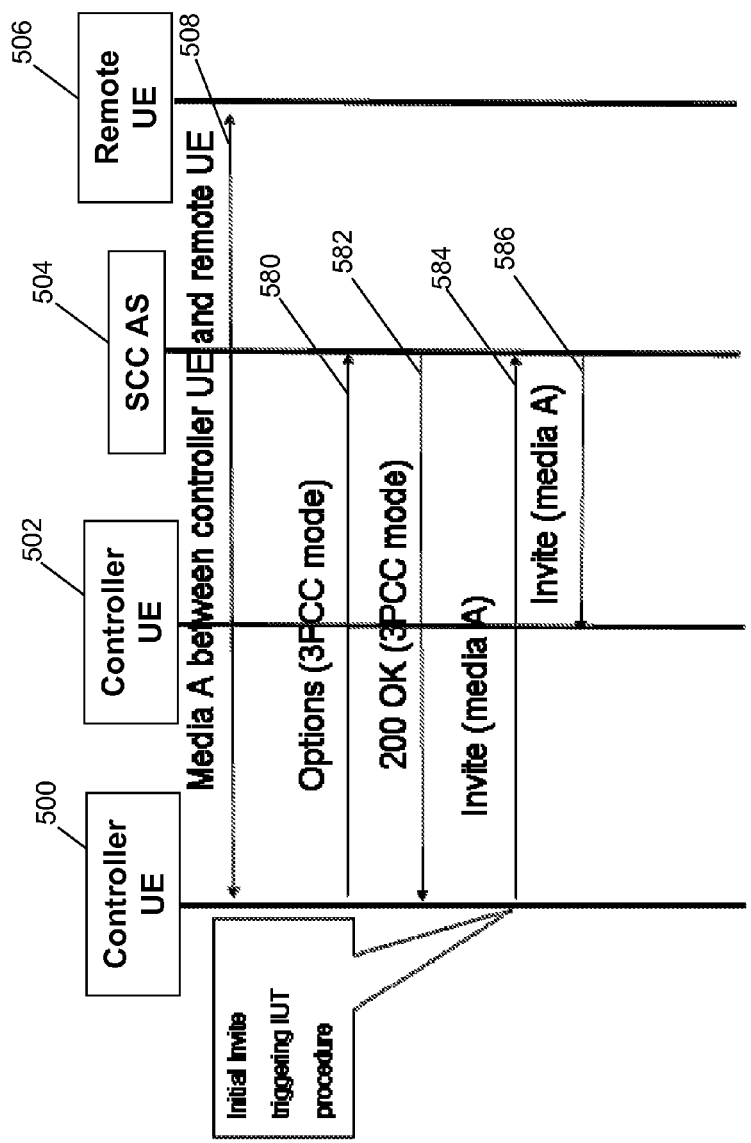
FIG. 11 illustrates a call flow for changing a mode of operation in accordance with some embodiments.

FIG. 11 illustrates messaging to set a mode of operation in accordance with some embodiments. FIG. 11 includes a controller UE 500, a controllee UE 502, a service consistency and continuity application server (SCC AS) 504, and a remote UE 506. In 508, there is a media flow between controller UE 500 and remote UE 508. Controller UE can send an options message 580 to SCC AS 504 to indicate the 3PCC mode that the SCC AS 504 should initiate upon receiving a request for a transfer of a media flow. The SCC AS 504, upon receiving options message 580, can update a database or memory to save this information for later use. The options message can indicate a mode of operation for a specific UE or for a specified number of UEs. After the SCC AS 504 sets the option, the SCC AS 504 sends an acceptance message (200 OK) 582 to controller UE 500. The initial invite 584 triggering the IUT procedure can then operate as specified within the options negotiation. In some embodiments, the options message 580 can indicate to SCC AS 504 that both network-based or controller-based operations are acceptable. In such a situation, SCC AS 504 can decide based on policies or rules how to proceed.

An example of a SIP options message 580 and an acceptance message 582 is depicted below:

```
OPTIONS sip:carol@chicago.com SIP/2.0
    Via: SIP/2.0/UDP pc33.atlanta.com;branch=z9hG4bKhjhs8ass877
    Max-Forwards: 70
    To: <sip:carol@chicago.com>
    From: Alice <sip:alice@atlanta.com>;tag=1928301774
    Call-ID: a84b4c76e66710
    CSeq: 63104 OPTIONS
    Contact: <sip:alice@pc33.atlanta.com>
    Accept: application/sdp
    3PCC mode supported: network-based; UE-based
    Content-Length: 0
SIP/2.0 200 OK
    Via: SIP/2.0/UDP pc33.atlanta.com;branch=z9hG4bKhjhs8ass877
    ;received=192.0.2.4
    To: <sip:carol@chicago.com>;tag=93810874
    From: Alice <sip:alice@atlanta.com>;tag=1928301774
    Call-ID: a84b4c76e66710
    CSeq: 63104 OPTIONS
    Contact: <sip:carol@chicago.com>
    Contact: <mailto:carol@chicago.com>
    Allow: INVITE, ACK, CANCEL, OPTIONS, BYE
    Accept: application/sdp
    Accept-Encoding: gzip
    Accept-Language: en
    Supported: network-based
```

As detailed above, the SIP options message 580 can include a number of modes that are supported and the acceptance message (200 OK) can select one of the options or indicate the options supported. In operation, a SIP OPTIONS message is sent to negotiate the 3PCC mode before triggering the IUT request. In response, the SCC AS processes the request as any other SIP request and sends a 200 OK if successful. The 200 OK can contain the network/operator preference which is chosen as the 3PCC mode for the IUT operation. In some embodiments, the 3PCC mode can be configured at the controller UE, but it can be overridden by what is decided by the SCC AS or another network device such as a PCRF (policy and charging rules function). The options message may also be configured to provide UE discovery. For example, currently in IUT UE discovery, certain assumptions are made based in part on an implicit registration set, which can be stored at the HSS (Home Subscriber Server). The discovery may involve determining the specific controllee UE to transfer media to or determining the capabilities (e.g., audio/videos formats supported) of a controllee UE. In some embodiments, the options messaging can be used to obtain or lookup information regarding a controllee UE or to determine capabilities of a controllee UE.

The SCC AS may obtain the 3PCC mode in several ways. For example, the 3PCC mode may be obtained through provisioning as part of initial launch configuration for IUT service. This may undergo several administrative changes during the subscription lifetime. In another example, the 3PCC mode can be obtained by downloading the user profile information associated with the subscriber over Sh interface. The HSS which houses the subscribed data may contain the 3PCC mode assignment for the given subscriber. The UE may obtain the 3PCC mode in several ways. For example, the 3PCC mode can be obtained through OMA DM configuration pushed to the controller UE or by a static configuration at UE. Some of the benefits of the mode of operation mechanism is that the operator can configure the IUT service as per their preferences and policies and based on roaming agreements set up between fellow operators. For example, when a UE is roaming, the mechanism comes in handy so a UE that supports IUT functionality may switch between modes as per network policies. In some embodiments, a SIP options request is modified to include a mode indicator, which is used by the gateway that implements a SCC AS to provide the functionality.

Figure 12:
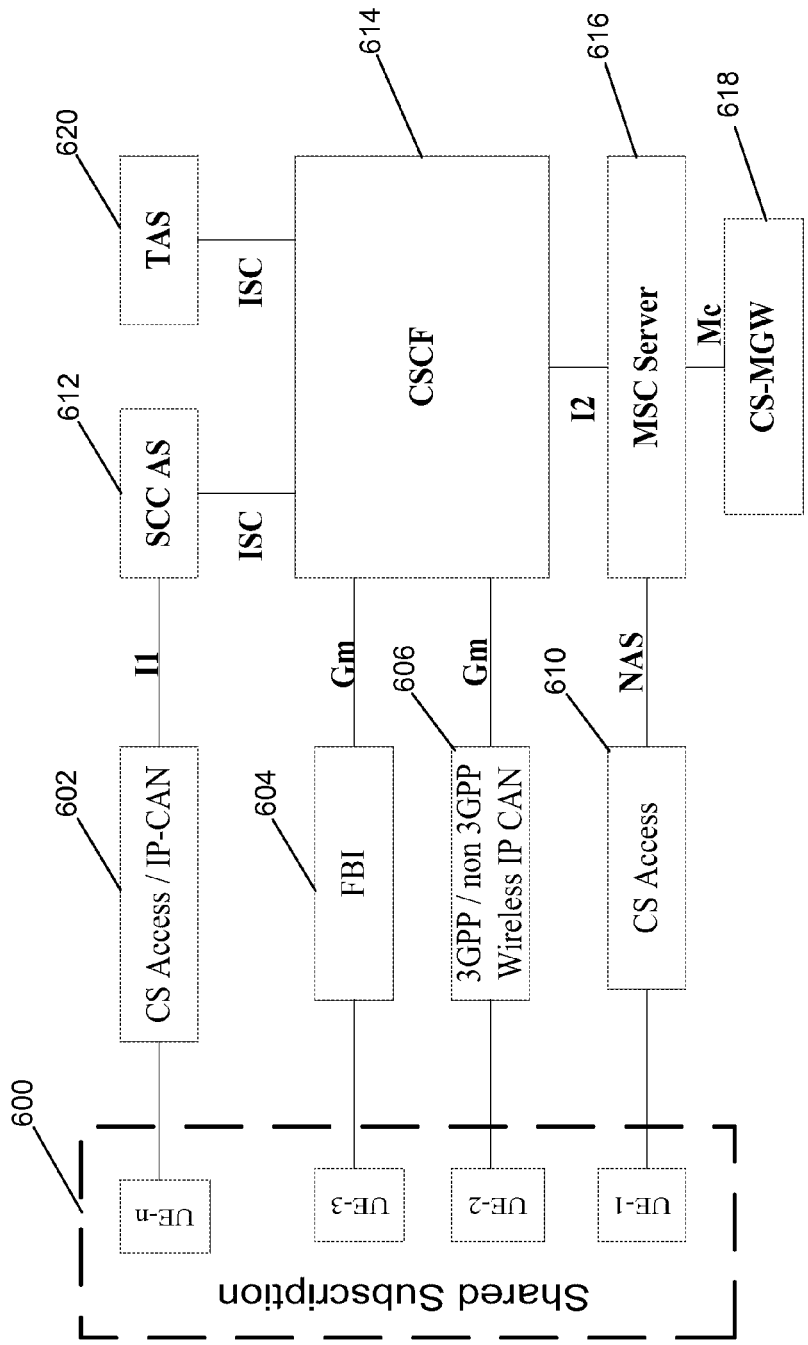
FIG. 12 illustrates different connection arrangements in a communication network in accordance with some embodiments.

Inter UE transfer allows a multimedia session to be split across one or more UEs and subsequently the media flows and service control can be transferred across UEs. The UEs share the same subscription and can connect to IMS core network from a diverse set of access networks as shown in FIG. 12. FIG. 12 includes a plurality of user equipment 600, a circuit-switched/packet-based access network 602, a fixed broadband interconnect (FBI) 604, a wireless packet-based access network 606, a circuit-switched access network 610, a SCC AS 612, a call session control function (CSCF) 614, a mobile switching center (MSC) server 616, a circuit switched media gateway (CS-MGW) 618, and a telephony application server (TAS) 620. In some embodiments the SCC AS 612 and the CSCF 614 can be implemented in a gateway as described below. As shown in FIG. 12, the UEs 600 share a subscription, which means that a user is authorized to transfer sessions from one UE to another UE.

In some embodiments, UEs can share a subscription by becoming authorized by the access network and providing access rights to allow a session transfer. This authorization process and access process can allow devices that are not necessarily on the same subscription receive data content. For example, a user may want to share multimedia content with a friend and the friend can grant access to his UE to allow the sharing of multimedia streams to the UE. The user can control the allowed access to their UE by setting the access rights. In another embodiment, user level authentication can be used to allow access to the device. This user level authentication can be provided by requiring a password or other secret key for access to the device.

As shown in FIG. 12, a number of different access technologies can be used to provide connectivity to user equipment 600. For example, an IMS service control (ISC) interface can be used to communicate between CSCF and application servers external to the CSCF functionality. Session initiation protocol (SIP) signaling can be used over the I1 and Gm interfaces to communicate with the user equipment. A MSC 616 can be used to inter-work SIP signaling for circuit-switched signaling to user equipment residing on a circuit-switched network 610. The FBI 604 can allow wired or wireless user equipment to connect to the gateway running CSCF 614 over a broadband connection. For example, an internet capable user equipment (such as an internet ready television or a digital video recorder) connected through an internet connection can have a session or component of a session transferred to it. Another access network can be wireless telephony access network 606 such as a 3G, 3.5G, 4G or other 3GPP or 3GPP2 standardized telephony standard. Also UEs that connect through a circuit switched network 610 can also receive a transfer of a session or transfer a session to another UE 600.

The gateway can also provide access network functionalities to provide network connectivity on the same network device as CSCF/SCC AS/CSE. In some embodiments, this can provide for a reduction in network devices used by a network provider, reduced signaling over the communication network, and scalability of network devices. The gateway by providing both IMS functionalities and access network functionalities on the same network device can also benefit from awareness of information regarding the other functionality. For example. Information regarding the bearer layer can be shared with IMS functionalities and information regarding SIP sessions can be shared with bearer layer functionalities in the gateway.

User Equipment And Gateway

The user equipment described above can communicate with a plurality of radio access networks using a plurality of access technologies and with wired communication networks. The user equipment can be a smartphone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The mobile device can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway can perform multiple and different integrated functionalities. In some embodiments, a packet data network gateway (PGW), a serving gateway (SGW), Gateway General packet radio service Support Node (GGSN), a serving GPRS support node (SGSN), an HRPD serving gateway (HSGW), a packet data serving node (PDSN), a foreign agent (FA), or home agent (HA) can be implemented on a gateway. Other types of functionalities can also be implemented on a gateway in other embodiments are a packet data inter-working function (PDIF), an access service network gateway (ASNGW), a base station, a access network, a User Plane Entity (UPE), an IP Gateway, an mobility management entity (MME), a packet data network gateway (PGW), a serving gateway (SGW), a session initiation protocol (SIP) server, a proxy-call session control function (P-CSCF), and an interrogating-call session control function (I-CSCF). In certain embodiments, one or more of the above-mentioned other types of functionalities are integrated together or provided by the same gateway.

The gateway can also support sessions originated from a Femto base station, which would connect to the gateway using a broadband network. A person or corporation may use a Femto base station in a home or business to support one or more mobile nodes, which can be user equipment. The gateway can provide trigger based traffic management during a handoff from a Femto base station to a macro base station, while maintaining traffic management for the mobile node. In certain embodiments, a gateway device is provided by Starent Networks, Corp. of Tewksbury, Massachusetts on an ST16 or ST40 multimedia platform.

Figure 13:
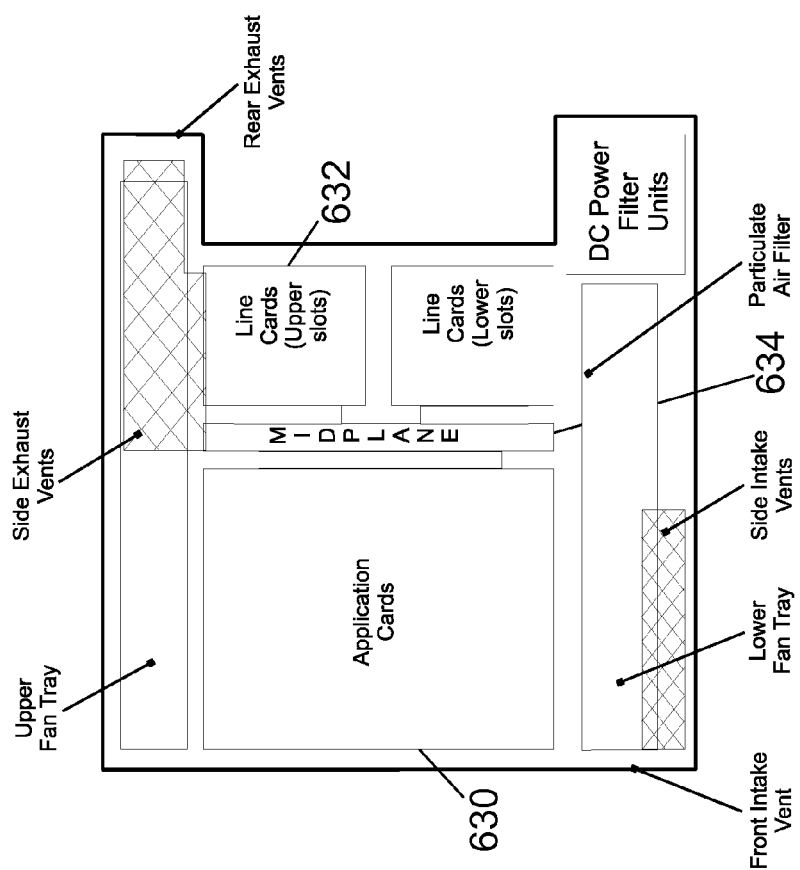
FIG. 13 illustrates a gateway device implementation in accordance with some embodiments.

FIG. 13 illustrates a gateway in accordance with certain embodiments. The gateway can include slots for loading application cards 630 and line cards 632. A midplane 634 can be used in the gateway to provide intra-gateway communications, power connections, and transport paths between the various installed cards. The midplane 634 can include buses such as a switch fabric, a control bus, a system management bus, a redundancy bus, and a time division multiplex (TDM) bus. The switch fabric is an IP-based transport path for user data throughout the gateway implemented by establishing inter-card communications between application cards and line cards. The control bus interconnects the control and management processors within the gateway. The gateway management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The gateway supports at least two types of application cards: a switch processor card and a packet accelerator card. The switch processor card serves as a controller of the gateway and is responsible for such things as initializing the gateway and loading software configurations onto other cards in the gateway. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the gateway provide input/output connectivity and can also provide redundancy connections as well.

In some embodiments, a ST40 embodiment of the gateway can support a system management card (SMC) and a packet services card (PSC), which are application cards 630. The system management card is a system control and management card for managing and controlling other cards in the gateway. The packet services card is a high-speed processing card that provides mutli-threaded point-to-point, packet data processing, and context processing capabilities, among other things.

The operating system software can be based on a Linux software kernel and run specific applications in the gateway such as monitoring tasks and providing protocol stacks. The software allows gateway resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a MAG, LMA, HSGW, P-GW, MME, PDSN, ASNGW, PDIF, HA, GGSN, or IPSG).

The gateway's software can be divided into a series of tasks that perform specific functions. These tasks communicate with each other as needed to share control and data information throughout the gateway. A task is a software process that performs a specific function related to system control or session processing. Three types of tasks operate within the gateway in some embodiments: critical tasks, controller tasks, and manager tasks. The critical tasks control functions that relate to the gateway's ability to process calls such as gateway initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a gateway include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the gateway by monitoring the various software and hardware components of the gateway. Recovery control task subsystem is responsible for executing a recovery action for failures that occur in the gateway and receives recovery actions from the high availability task subsystem. Shared configuration task subsystem provides the gateway with an ability to set, retrieve, and receive notification of gateway configuration parameter changes and is responsible for storing configuration data for the applications running within the gateway. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the gateway, which include creating separate VPN contexts, starting IP services within a VPN context, managing IP pools and subscriber IP addresses, and distributing the IP flow information within a VPN context. In some embodiments, within the gateway, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

A session manager can track the mapping of the sessions and processing to provide the emulation and inter-working between the networks. A database can also be used to map information between the sessions, and store, for example, NAI, HoA, AE information in some embodiments.

In some embodiments, the software needed for implementing a process or a database includes a high level procedural or an object-orientated language such as C, C++, C#, Java, or Perl. The software may also be implemented in assembly language if desired. Packet processing implemented in a gateway can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow. Other embodiments are within the following claims. For example, the mobility management entity (MME) can be combined or co-located with the gateway.

We claim:

1. A gateway providing a service consistency and continuity (SCC) application server (AS) functionality for use in communicating in a session with at least one user equipment (UE) in a communication network, the gateway comprising:
   an interface for communicating with the at least one user equipment (UE) in the session, wherein the session includes a media stream and a service control signaling path used to perform service control of the session;
   a continuous service experience (CSE) module configured to support separate and independent transfer of the media stream and service control across a plurality of user equipment anchored at the SCC AS;
   an authorization module configured to
   authorize the transfer of the media stream based upon a media transfer request received from the at least one UE with service control, wherein the media transfer request identifies the media stream to transfer and at least one target UE to which to transfer the media stream, and initiates the transfer of the media stream to the at least one target UE, and to
   authorize the transfer of the service control based upon a service control transfer request received from the at least one UE with service control, wherein the service control transfer request identifies the session and a target UE to which to transfer the service control.

2. The gateway of claim 1, further comprising:
   a call session control function (CSCF) module configured to provide access to an IP multimedia subsystem (IMS) core network from a variety of access networks; and
   a packet data network gateway (PGW) configured to receive packets from the at least one UE.

3. The gateway of claim 1, wherein the gateway supports sessions with a Femto base station and provides transfer of the session to a UE receiving connectivity through the Femto base station.

4. The gateway of claim 1, wherein the SCC AS receives the media transfer request from a first UE of the at least one UE to transfer a voice stream and a video stream to a second UE and to retain service control at the first UE.

5. The gateway of claim 4, wherein the SCC AS authorizes the transfer when the first UE and the second UE share a same subscription.

6. The gateway of claim 5, wherein the SCC AS receives the service control transfer request from the first UE to transfer the service control to a third UE.

7. The gateway of claim 4, wherein the SCC AS acknowledges to the first UE that the media transfer request was successfully completed so the media stream is deactivated.

8. The gateway of claim 1, wherein the SCC AS routes the media transfer request to a border gateway control function (BGCF) to be inter-worked with a circuit-switched domain when at least one target UE is on the circuit-switched domain.

9. The gateway of claim 1, wherein the SCC AS is configured to communicate differently depending on a mode of operation that is set by an options message received by the SCC AS.

10. A method of transferring a session among a plurality of user equipment (UE) in communication with a service consistency and continuity (SCC) application server (AS) functionality that resides on a gateway, the method comprising:
- receiving, at the SCC AS, a media transfer request from a first UE to transfer at least one media stream in the session to at least one target UE, wherein the first UE includes service control over the session;
- authorizing, at the SCC AS, the transfer of the at least one media stream from the first UE to the at least one target UE independently and separately of a transfer of service control of the session;
- sending, from the SCC AS, to the at least one target UE a media transfer request to transfer the at least one media stream;
- sending, from the SCC AS, to the first UE an acknowledgement when the transfer of the at least one media stream is complete so that the at least one media stream to the first UE is deactivated;
- receiving, at the SCC AS, from the first UE signaling regarding service control of the at least one media stream to the at least one target UE; and
- managing, at the SCC AS, the at least one media stream to the at least one target UE based on the first UE control signaling.

11. The method of claim 10, further comprising receiving packets, at the gateway, intended for a packet data network gateway (PGW) functionality residing on the gateway.

12. The method of claim 10, further comprising sending session data to a Femto base station.

13. The method of claim 10, wherein the at least one media stream includes a voice stream and a video stream and the target UE is a television.

14. The method of claim 10, further comprising determining, at the SCC AS, whether the at least one target UE and the first UE share a same subscription in the transfer of the at least one media stream.

15. The method of claim 10, further comprising:
- receiving, at the SCC AS, a service control transfer request from the first UE to transfer service control to a second UE independently and separately of the transfer of the at least one media stream;
- authorizing, at the SCC AS, the transfer of the service control from the first UE to the second UE; and
- determining, at the SCC AS, whether the second UE and the first UE share a same subscription in the transfer of service control.

16. The method of claim 10, further comprising routing the media transfer request to be inter-worked with a circuit-switched domain when the target UE is on the circuit-switched domain.

17. The method of claim 10, further comprising receiving, at the SCC AS, a mode of operation indication that determines how the SCC AS operates.

18. The gateway of claim 1, wherein the authorization module initiates the transfer of the media stream to a first UE, and the target UE to which to transfer the service control is a second UE, wherein the first UE and the second UE are not the same UE.

19. The method of claim 10, further comprising receiving, at the SCC AS, a service control transfer request from the first UE to transfer service control to a second target UE, different from the target UE to which the at least one media stream has been transferred, independently and separately of the transfer of the at least one media stream; and authorizing, at the SCC AS, the transfer of the service control from the first UE to the second target UE.

* * * * *